United States Patent [19]

Melen

[11] Patent Number: 5,719,960
[45] Date of Patent: Feb. 17, 1998

[54] SYSTEM FOR DISPATCHING TASK ORDERS INTO A USER NETWORK AND METHOD

[75] Inventor: Roger D. Melen, Los Altos Hills, Calif.

[73] Assignee: Canon Kabushiki Kaisha, Tokyo, Japan

[21] Appl. No.: 670,955

[22] Filed: Jun. 26, 1996

[51] Int. Cl.$^6$ ..................................................... G06K 9/64
[52] U.S. Cl. ........................ 382/209; 382/217; 358/470
[58] Field of Search ..................................... 382/180, 209,
382/217, 215; 355/200, 203, 202, 204;
358/443, 467, 468, 470

[56] References Cited

U.S. PATENT DOCUMENTS

| | | | |
|---|---|---|---|
| 4,106,060 | 8/1978 | Chapman | 358/256 |
| 4,686,704 | 8/1987 | Kamada et al. | 382/61 |
| 4,748,317 | 5/1988 | Satoh | 382/62 |
| 4,811,111 | 3/1989 | Kurokawa | 358/257 |
| 4,970,554 | 11/1990 | Rourke | 355/202 |
| 5,124,748 | 6/1992 | Tanabe et al. | 355/200 |
| 5,153,746 | 10/1992 | Satoh | 358/401 |
| 5,255,104 | 10/1993 | Kajigaya | 358/403 |
| 5,325,212 | 6/1994 | Endo | 358/468 |

Primary Examiner—Thomas D. Lee
Assistant Examiner—Jerome Grant, II
Attorney, Agent, or Firm—Paul Hentzel

[57] ABSTRACT

Task order system 10 dispatches task orders throughout user network 10N concerning user record documents. Task order 10T is carried on an input medium suitable for scanning such as ordinary paper, and specifies both the dispatch task and the record document. The task order contains an input task identification (ID) 22 and record document index symbols 24. Scanner 10S receives the input medium and scans the task order thereon to obtain pixel images of the input ID and the index symbols. Classifier 10C receives the pixel images from the scanner for classification into an input ID code, and index codes. Template library 10L has a task ID template which defines the corresponding each task ID. Selector 11S selects the template code which matches the input ID code. Display device 10D notifies the user if the selection was unsuccessful. The user may correct the input ID code or manually select a template code from user keys 10K. Dispatcher 16D is responsive to the selected template code for dispatching the task order. Input cross-check symbols 24C and input digit count number 24D may be employed to verify that the scanning and classifying were accurately performed.

39 Claims, 3 Drawing Sheets

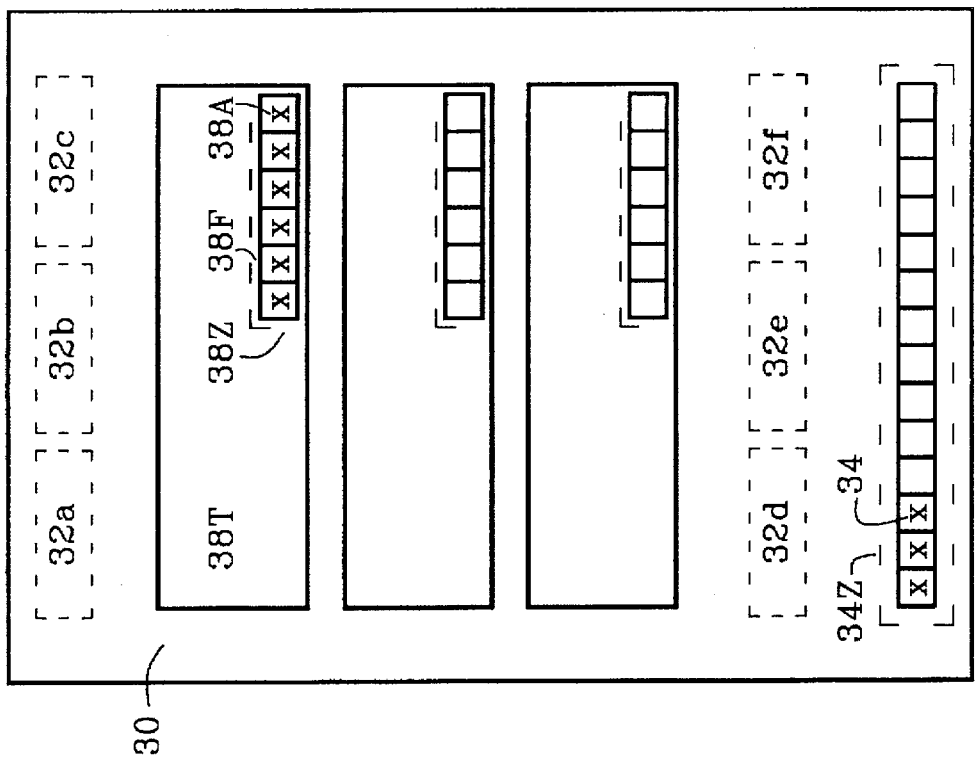
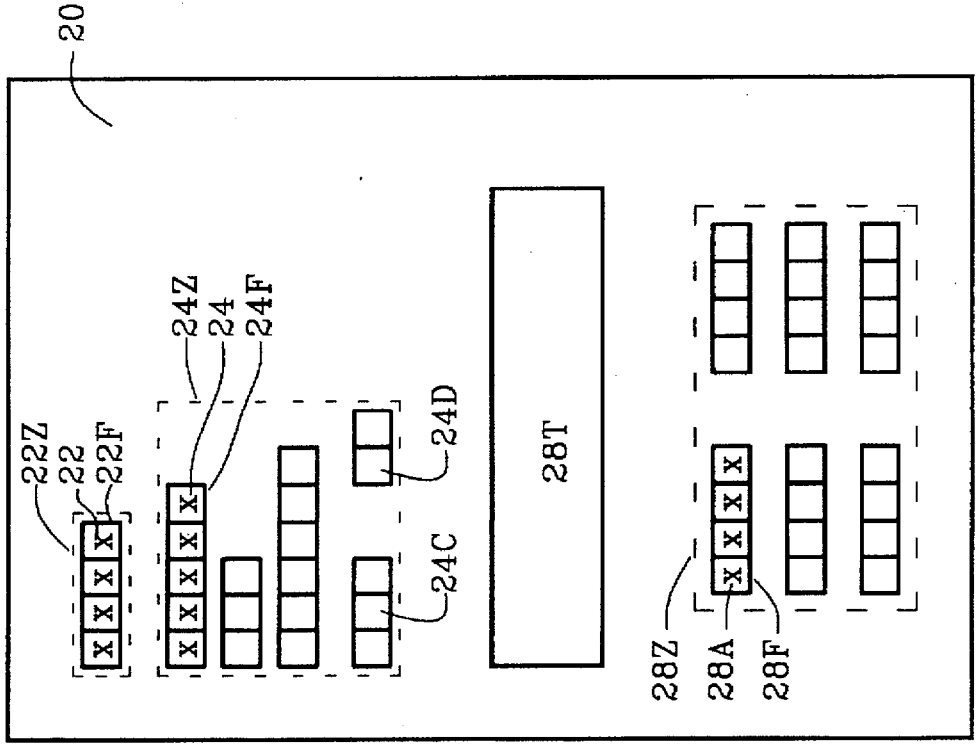
Fig 3
Fig 2

SYSTEM FOR DISPATCHING TASK ORDERS INTO A USER NETWORK AND METHOD

TECHNICAL FIELD

This invention relates to dispatching record document task orders throughout a user network, and more particularly to such task orders that are identified by task ID symbols for record documents that are indexed by cross-checked index symbols.

BACKGROUND

Heretofore tasks concerning record documents were dispatched by instructions hand entered directly by the user from a terminal keyboard. The user entered the definition of the task, which was typically filing or retrieving record documents. The user also entered database index numbers required to place or locate the record document. The full task instruction and document index number had to entered each time that task was executed.

Error detection and correction techniques have been employed in memory and tape drive data transfers, and in bar code formats. Parity bits/codes were commonly used to monitor for errors in routine read/write operations. However, such detection and correction techniques have not been employed in the keyboard task instruction entries.

SUMMARY

It is therefore an object of this invention to provide an improved apparatus and method for dispatching record document task orders throughout a user network.

It is another object of this invention to provide such an apparatus and method which employs an index cross-check code generated by a mathematical operation.

It is another object of this invention to provide such an apparatus and method which employs an index digit count code.

It is a further object of this invention to provide such an apparatus and method which notifies the user when the codes indicates an error.

It is a further object of this invention to provide such a method which visually presents the user a suspected error along with a suggested correction.

It is a further object of this invention to provide such an apparatus and method to provide a task order which is easily modified for new dispatch tasks.

It is a further object of this invention to provide such a method to provide a task including abstract data which may be extracted for user abstracts.

Briefly, these and other objects of the present invention are accomplished by providing an apparatus and method for dispatching task orders throughout a user network. The task order contains an input task ID formed by symbols within an ID entry zone. The input ID is one of a set of "T" task IDs, one task ID for each dispatch task in a set of "T" dispatch tasks. The task order also contains record document index symbols within index entry zones located within the task order at predetermined positions relative to the ID entry zone. The index symbols form a unique sequence associated with a particular record document. A scanner scans the task order to obtain an input pixel image of the input ID and index pixel images of the index symbols. A classifier classifies the input pixel image and the index pixel images to obtain an input digital code and index digital codes. A template library has a set of "T" task ID templates in digital code. Each template code corresponding to one task ID in the set of "T" task IDs. The template code defines the corresponding dispatch task in the set of "T" dispatch tasks. A zone file library has a set of "T" zone files one for each template code in the library of templates. The zone files specify the predetermined positions of the index entry zones relative to the ID entry zone for the task ID corresponding to each template code. A selector compares the input code to the set of "T" template codes for selecting the template code which matches the input code. A retriever retrieves the zone file for the selected template code, and retrieves the index codes corresponding to index symbols in the index entry zones in the predetermined positions specified by the retrieved zone file. A dispatcher dispatches the task order on the record document associated with the retrieved index codes in accordance with a dispatch task defined by the selected template code.

BRIEF DESCRIPTION OF THE DRAWING

Further objects and advantages of the present task dispatching invention and the operation of the cross-check features will become apparent from the following detailed description and drawing (not drawn to scale) in which:

FIG. 2 is a diagram of a task order sheet having a single position for the input ID symbols;

FIG. 3 is a schematic diagram of a task order sheet having multiple positions for the input ID symbols.

Figure 1:
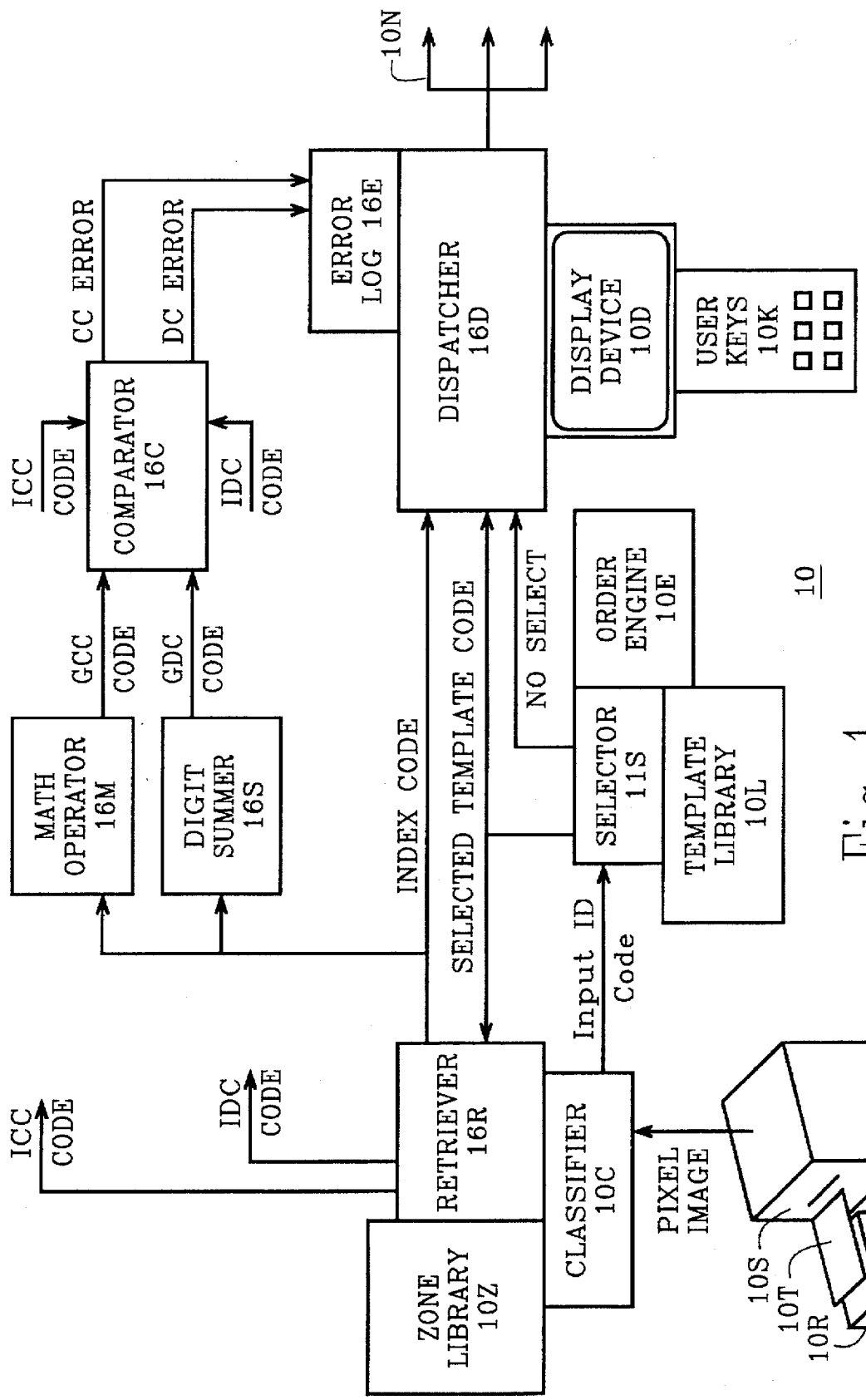
FIG. 1 is a block diagram of the task order system showing the apparatus for dispatching record document tasks.

The first digit of each reference numeral in the above figures indicates the figure in which that element is most prominently shown. The second digit indicates related structural elements, and a final letter (when used) indicates a sub-portion of an element.

General System—Block Diagram (FIG. 1)

Task order system 10 dispatches task orders throughout user network 10N concerning user record documents. Task order 10T is carried on an input medium suitable for scanning such as ordinary paper, and specifies both the dispatch task and the record document. The task order contains input task identification (ID) 22 (see FIG. 2) formed by symbols (represented by "x"s) within ID entry zone 22Z. The input ID is one of a set of "T" task IDs, one task ID for each type of dispatch task in a set of "T" dispatch tasks. One type of dispatch task retrieves a record document from one database and moves (or copies) the record document to another database. Other types of dispatch tasks retrieve record documents for printing locally or faxing to remote locations. A common dispatch task involves locally scanning a hardcopy of the record document, and filing the pixel image (or codes) into a memory database (see Filing Record Document section).

The task order also contains record document index symbols 24 (see FIG. 2) within index entry zones 24Z located within the task order at predetermined positions relative to the ID entry zone. The predetermined relationship facilitates locating the index symbols within the task order once the task ID has been determined. The index symbols form a unique sequence of characters associated with a particular record document. The indexing systematically organizes the record documents within one or more databases for filing, transfer, and retrieval. A record document is the fundamental unit of information stored within the database at a single address which is indexed for access. The record document may be an entire report or book, or a single sheet or chapter within a book, or merely a cluster of facts which are accessed as a unit.

Scanner 10S receives the input medium and scans the task order thereon to obtain a pixel image of the task order including an input pixel image of the input ID and index pixel images of the index symbols. Classifier 10C receives the pixel images from the scanner for classification by OCR techniques into digital codes such as ASCII codes or unacodes for pictograms. The input pixel image is classified into an input ID code, and the index pixel images are classified into index codes. The classifying software may be "robust" and capable of classifying a wide range of character fonts. However a single known font which is highly OCR compatible is preferred for the task ID symbols and index symbols.

Template library 10L has a set of "T" task ID templates in digital code. Each template code corresponds to one task ID in the set of "T" task IDs, and defines the corresponding dispatch task in the set of "T" dispatch tasks. Zone file library 10Z has a set of "T" zone files one for each template code in the library of templates. The zone files specify the predetermined positions of the index entry zones relative to the ID entry zone for the task ID corresponding to each template code. In a complex task ordering system, each zone may be a collection of entry fields for a collection of index numbers. In a simple system, each zone may be a single field for a single index number.

Selector 11S compares the input ID code from the classifier to the set of "T" template codes and selects the template code which matches the input code. The selection may be accomplished by sequentially examining the template list. Display device 10D may be any suitable monitor, responsive to the selector for notifying the user if the selector was unable to select a template code which matches the input ID code. An unsuccessful selection may be due to an incorrectly classified input ID image, resulting in an input ID code which does not have a match in the template library. The task order may not have contained a proper input ID symbol, or may not have even been a task order sheet but a only misplaced sheet of record document. The user may correct the input ID code or manually select a template code from user keys 10K.

Retriever 16R is responsive to the selected template code for retrieving the zone file for the selected code containing the predetermined position of the index symbols. The retriever then retrieves the index codes from classifier 10C corresponding to the index symbols in the index entry zones using the predetermined positions specified by the retrieved zone file. Dispatcher 16D is responsive to the selected template code and the retrieved index code for dispatching the task order on the record document associated with the retrieved index codes, in accordance with a dispatch task defined by the selected template code.

Input cross-check symbols 24C (see FIG. 2) may be contained on the task order in addition to the input task ID and the record document index symbols. The input cross-check symbols have been previously determined by combining the index symbols in accordance with a predetermined mathematical operation. The input cross-check symbols are scanned by the scanner to obtain a cross-check pixel image, and classified by the classifier to obtain a digital input cross-check code (ICC CODE). Mathematical operator 16M combines the retrieved index codes in accordance with the predetermined mathematical operation to provide a generated cross-check code (GCC CODE). Comparator 16C compares the GCC CODE with the ICC CODE to establish that the cross-check codes are the same and that the scanning and classifying were accurately performed. The comparator provides a cross-check error status signal (CC ERROR) to the dispatcher indicating whether the cross-check procedure was error free or contained a cross-check error. Disparity between the ICC CODE and the GCC CODE may be caused by scanning problems such as skewed paper, variations in scanning speed, and loss of registration between the paper and the scanned pixel image. Disparity may also be introduced by paper problems such as low quality symbols and background noise.

Input digit count number 24D (see FIG. 2) may be contained on the task order in addition to the input task ID, the record document index symbols and the input cross-check symbols. The digit count has been previously determined by summing the digit places in the index symbols. The digit count is scanned by the scanner to obtain a digit count pixel image and classified by the classifier to obtain an input digit count code (IDC CODE). Digit summer 16S sums the digit places in the retrieved input digit count code to provide a generated digit count code (GDC CODE). Comparator 16C also compares the GDC CODE with the IDC CODE to establish that the digit codes are the same. This second comparison provides a further indication that the scanning and classifying were accurately performed. The comparator also provides a digit count error status signal (DC ERROR) to the dispatcher indicating whether the digit count procedure was error free or contained a digit count error.

When the GDC CODE is less than the IDC CODE, the underlying error involves the loss of a character. Two adjacent characters in the index symbols may have been too close (or actually touching) and were classified as a single character. A character in the index symbols may have become obliterated by fading or stable holes. When the GDC CODE is greater than the IDC CODE, the underlying error involves the creation of a "pseudo" character. A single long character in the index symbols may have been classified as two adjacent characters; or a foreign particle smudge on the task order may have been classified as low toner symbol such as a punctuation mark. The display device is also responsive to the error status signals from the comparator to the dispatcher for notifying the user of the error status. That is, whether the GCC CODE and the ICC CODE are the same or not the same, or whether the GDC CODE and the IDC CODE are the same or not the same. Error log 16E is responsive to the comparator error status signals for maintaining an log of each cross-check error. The log facilitates notifying the user of the error status at a later time.

Task Order Embodiments (FIGS. 2 and 3)

Task order 10T may be carried on a single sheet of paper 20 specifically designed for dispatching task orders, as shown in the embodiment of FIG. 2. ID entry zone 22Z contains task ID entry field 22F for receiving task ID symbols 22. Index entry zone 24Z contains record document index entry fields 24F for receiving index symbols 24. The index symbols may be a collection of alpha-numeric entries such as contract numbers, document control numbers and report numbers, plus dates and subject matter keywords. A single index entry zone may contain all of the index entry fields as shown in the embodiment of FIG. 2. The index entry zone may be located in any suitable position within the task order relative to the ID entry zone. In the embodiment of FIG. 2, index entry zone 24Z is located in the upper lefthand region of sheet 20 where heading material customarily appears in memos and reports. Alternatively, as shown in the embodiment of FIG. 3, index entry zone 34Z may be located along the bottom margin of sheet 30, and the index symbols may be a single alpha-numeric entry 34.

Input cross-check symbols 24C and input digit count number 24D may be contained within the index entry zone along with the index symbols for convenient access. After classification and template code selection, the input cross-check code and the input digit count code and the index codes may be retrieved together by retriever 16R. The task ID symbols, index symbols, and cross-check symbols are preferable typed on preprinted task order sheets. However, the symbols may be formed by an ink stamped legend or even hand written by the user. A constrainment grid for guiding hand entered symbols is described in U.S. patent application entitled METHOD OF NETWORK DISTRIBUTION OF RECORD DATA USING TRANSMITTAL SYMBOLS HAND ENTERED ON A TRANSMITTAL SHEET by Inventors Roger D. Melen and Radovan V. Krtolica, U.S. Ser. No. 08/567,763, filed 05 Dec., 1995, and assigned to the present assignee.

In the embodiment of FIG. 2, the task order has only one ID entry zone 22Z for all of the task IDs in the set of "T" task IDs. Further, this single ID entry zone has an assigned position within the task order. Alternatively, the task order may have "T" assigned positions, one position for each of the "T" task IDs in the set of "T" task IDs. The embodiment of FIG. 3, shows six such assigned positions (32a, 32b, 32c, 32d, 32e, and 32f) at various sites throughout the task order. Assigned positions facilitate template selection (see General Method section-Dispatching Step).

The position tolerance of the scanning and classifying define a margin of acceptance for the placement of symbols on the task order. The task ID symbols with assigned positions have the highest tolerance and largest margin of acceptance. Once the ID symbol is located, the index entry zone is easier to locate because this entry zone is in a predetermined position relative to the ID symbol. The entry fields within the entry zones therefore may have a lower tolerance and smaller margin of acceptance. Field registration marks may be employed proximate the entry fields to facilitate registration with the entry zones. Finally, the actual index and cross-check symbols have the lowest tolerance. Close placement of these symbols improves the speed and quality of the classification.

The main portion of task order 20 contains auxiliary data entries 28A within auxiliary zones 28Z for auxiliary matters such as preparing reports or data abstracts (see Auxiliary File section). The auxiliary zones are in predetermined positions on the task order distinct from the predetermined positions of the index entry zone. The auxiliary data symbols may be typed or hand entered into auxiliary fields 28F by the user during an inspection tour or work shift as part of a report. The auxiliary zones may include non-text information such as hand drawn diagrams illustrating a malfunction and maps showing the location of a problem. These non-constrained entries may include signatures for verification and authorization.

Task order 20 also contains instructional text 28T for assisting the user in dispatching the record document tasks. The instructional text does not have a specific location on the task order and may not form part of the record document. It is normally not necessary to classify or dispatch the instructional text. Task order 30 of the embodiment of FIG. 3, has several auxiliary zones 38Z with entry fields 38F for receiving particular auxiliary data entries 38A. Each auxiliary zone 38Z is associated with a block of instructional text 38T for assisting the user in entering the proper auxiliary data into the auxiliary zone.

Figure 4:
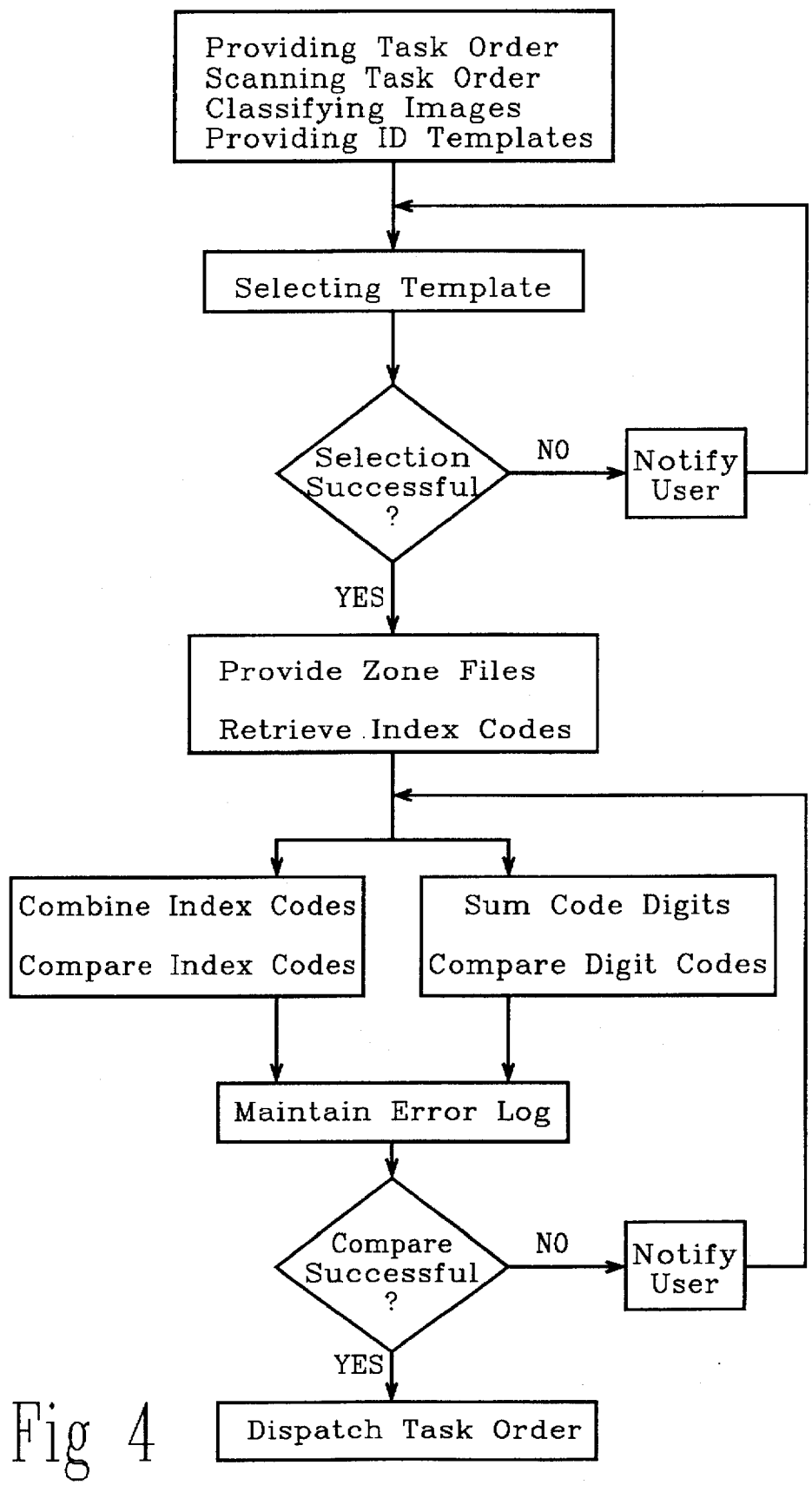
FIG. 4 is a flow chart showing the general method of dispatching record document tasks.

General Method—Flow Chart (FIG. 4)

The primary steps of the general method of dispatching task orders throughout a user network is shown in the flow chart of FIG. 4. The steps of the method are described below with reference to task order system 10 of FIG. 1 and task order embodiments of FIGS. 2 and 3.

Providing a task order carried on input medium suitable for scanning. The task order contains the input task ID, and record document index symbols.

Scanning the input medium for obtaining the pixel image of the task order thereon including the input pixel image of the input ID and the index pixel images of the index symbols.

Classifying the pixel images (the input pixel image and the index pixel images) to obtain the input digital code and the index digital codes.

Providing a set of "T" task ID templates in digital code. The "T" template codes are stored in template library 10L.

Selecting a template ID code which matches the input ID code, by comparing the input ID code to the set of "T" template codes.

Providing a zone file for the selected template code from a set of "T" zone files. The "T" zone files are stored in zone file library 10Z.

Retrieving the record document index codes corresponding to index symbols in the index entry zones.

Dispatching the task order on the record document associated with the retrieved index codes in accordance with the dispatch task defined by the selected template code.

For embodiments with a single assigned position for the input ID code (see FIG. 2), or multiple assigned positions (see FIG. 3); the classifying step may be two separate steps, an input classifying step and an index classifying step. The input classifying step occurs after the scanning step and before the template selecting step. During the input classifying step the input ID pixel image from an assigned ID position is classified. The index classifying step occurs after the template selecting step and before the dispatching step. During the index classifying step the index pixel images are classified. The assigned positions of the input ID image permits the input ID to be extracted from the pixel image and classified prior to the remainder of the task order. If the selection of a template code is not successful, the subsequent index classifying step is not necessary and may be aborted. Without a selected template code, the related index zone file with the input ID code positions cannot be retrieved.

In the assigned task ID position embodiment, the input code obtained from the pixel image corresponding to the assigned ID positions, may be retrieved immediately for comparison with the set of "T" template codes. During the template selecting step, the order of comparison may be designed to accelerate the selection of a template code. The comparison may be in order of historical frequency of use. The most frequently used templates are compared first. Often the selection is successful after the first or second comparison. Alternatively, the comparison of the input code may be in order of most recent use. Order engine 10E establishes the selection order of the template codes. The order engine is responsive to the selector for recording the frequency of use history and most recent use of prior input codes from the classifier. In an embodiment with unassigned task positions, the library of templates must be compared with every digital code obtained from the classification of the pixel images.

The general method may have the following additional step.

Notifying the user after the selection step and before the providing zone file step, if a template has not been selected. The selector forwards a no selection status signal (NO SELECT) to the dispatcher in order to initiate the user notification. If the selection is successful, the method proceeds to the providing a zone file step without notifying the user. This notification step may include displaying both the input pixel image of the task ID scanned from the input medium and the input ID code classified from the input pixel image, for visual review by the user. The user may intuitively realize the source of the error, edit the index code through user keys 10K, and manually return to the selection step.

An embodiment employing input cross-check symbols on the task order, includes the following additional steps.

Combining the retrieved index codes in accordance with a predetermined mathematical operation, after the retrieving step and before the dispatching step, to provide a generated cross-check code (GCC CODE).

Comparing the GCC CODE with the input cross-check code (ICC CODE) to determine whether the cross-check codes are the same establishing that the scanning step and the classifying step were accurately performed. The ICC CODE is obtained by classifying the input cross-check symbols on the task order. Mathematical operator 16M provides the predetermined mathematical operation, and comparator 16C compares the cross-codes (see General System section).

An embodiment employing an input digit count on the task order, includes the following additional steps.

Summing the digits in the generated cross-check code after the retrieving step and before the dispatching step, to provide a generated digit count code (GDC CODE).

Comparing the input digit count code (IDC CODE) with the GDC CODE. Digit summer 16S provides the GDC CODE, and comparator 16C compares the count codes (see General System section).

Mathematical Operators

The predetermined mathematical operation for generating the GCC CODE (and the ICC CODE) from the numerical values of the symbols forming the index codes (and the input cross-check symbols), may be any mathematical operation provided by mathematical operator. In one embodiment the predetermined mathematical operation involves forming the GCC CODE by summing the numerical values of the retrieved index codes. In another embodiment the mathematical operation involves summing the numerical values of only the "L" least significant digits (LSDs) of the retrieved index codes. The LSDs are statistically more active than the MSDs and are more likely to yield unique cross-check string of symbols.

The mathematical operation may further involve multiplying the retrieved index codes by 1,000 (or by a prime number near 1,000) prior to summing. The multiplication spreads the cross-check codes into a longer number for more readily revealing any potential sources of error, and to prevent cancellation of two counter effective errors.

The general method may have the following additional steps.

Notifying the user of any cross-check errors after the cross-check comparing step and before the dispatching step, if the generated cross-check code and the input cross-check code are not the same.

Maintaining a cross-check error log after the cross-check comparing step and before the notifying step, to facilitate notifying the user.

Presenting cross-check errors to the user for visual review by displaying simultaneously:

1) the pixel image of the input ID, and the pixel images of the index symbols, and the pixel image of the input cross-check symbols, scanned from the task order; and 2) the input code classified from the input pixel image, and the index codes classified from the index pixel image, and the input cross-check code classified from the cross-check pixel image.

The presenting step may further include displaying suspected error sites to the user with highlighting, and presenting user options to resolve the error. The user may correct the error or elect an option through user keys 10K.

Filing Record Document Embodiment

The dispatch task corresponding to the selected template code may be the task of filing record document 10R into a filing destination in user network 10R. The task order becomes a cover sheet accompanying the record document. Filing a plurality of record documents in a que stack to be scanned, requires a task order cover sheet between each record document in the stack in order to separate the documents. The filing task embodiment may require the following additional steps.

Providing the record document to be filed carried on a medium suitable for scanning prior to the scanning step.

Scanning the record document to obtain a pixel image of the record document for filing during the dispatching step.

The record document to be filed may be a plurality of sheets, with a single cover sheet thereover scanned together. Alternatively, the record document may have limited text carried on a single of sheet along with the task order.

Auxillary File

The dispatching step of the general method may further comprise the following additional step.

Creating an auxiliary file associated with the record document file for containing auxiliary data. The auxiliary data from the task order is placed in the auxiliary file for future retrieval in reports and for scheduling purposes. For example, one piece of auxiliary data may be the name of the preparer of the record document (or the task order). All record documents prepared by that person can be retrieved in a data abstract. Another piece of auxiliary data may be the date that the record document was prepared with a deadline response date by the recipient of the record document. All record documents with an open response date can be retrieved in an action abstract. Key words may form the auxiliary data for subject matter abstracts and reports.

Industrial Applicability

It will be apparent to those skilled in the art that the objects of this invention have been achieved as described hereinbefore by providing an improved apparatus and method for dispatching record document task orders throughout a user network. The task order may be easily modified for more dispatch tasks by creating additional task IDs and corresponding template codes.

Clearly various changes may be made in the embodiments shown herein without departing from the concept of the invention. For example the abstract data feature may be employed independently of the cross-check code or digit count code. Further, features of the embodiments shown in the various figures may be employed with the embodiments of the other figures.

Therefore, the scope of the invention is to be determined by the terminology of the following claims and the legal equivalents thereof.

I claim as my invention:

1. Apparatus for dispatching task orders throughout a user network concerning user record documents, comprising:

input medium suitable for scanning;

task order means carried on the input medium, the task order means containing an input task ID formed by symbols within an ID entry zone, the input ID being one of a set of "T" task IDs, one task ID for each dispatch task in a set of "T" dispatch tasks;

the task order means containing record document index symbols within index entry zones located within the task order means at predetermined positions relative to the ID entry zone, the index symbols form a unique sequence associated with a particular record document;

scanning means for scanning the input medium to obtain a pixel image of the task order means thereon, including an input pixel image of the input ID and index pixel images of the index symbols;

classifying means for classifying the input pixel image and the index pixel images to obtain an input digital code and index digital codes;

template library having a set of "T" task ID templates in digital code, each template code corresponding to one task ID in the set of "T" task IDs, and defining the corresponding dispatch task in the set of "T" dispatch tasks;

zone file library having a set of "T" zone files, one for each template code in the library of templates, the zone files specify the predetermined positions of the index entry zones relative to the ID entry zone for the task ID corresponding to each template code;

selector means for comparing the input code to the set of "T" template codes for selecting the template code which matches the input code;

retriever means for retrieving the zone file for the selected template code, and for retrieving the index codes corresponding to index symbols in the index entry zones in the predetermined positions specified by the retrieved zone file;

dispatcher means for dispatching the task order on the record document associated with the retrieved index codes in accordance with a dispatch task defined by the selected template code.

2. The apparatus of claim 1, further comprising display means responsive to the selector means for notifying the user if the selector means was unable to select a template code which matches the input code.

3. The apparatus of claim 1, further comprising:

input cross-check symbols contained on the task order means in addition to the input task ID and the record document index symbols, the input cross-check symbols being previously determined by combining the index symbols in accordance with a predetermined mathematical operation, which input cross-check symbols are scanned by the scanning means to obtain a cross-check pixel image and classified by the classifying means to obtain a digital input cross-check code;

mathematical operator means for combining the retrieved index codes in accordance with the predetermined mathematical operation to provide a generated cross-check code; and comparator means for comparing the generated cross-check code with the input cross-check code to establish that the cross-check codes are the same indicating that the scanning and classifying was error free.

4. The apparatus of claim 3, further comprising display means responsive to the comparator means for notifying the user if the generated cross-check code and the input cross-check code are not the same.

5. The apparatus of claim 4, further comprising error log means responsive to the comparator means to facilitate notifying the user if the generated cross-check code and the input cross-check code are not the same.

6. The apparatus of claim 3, further comprising input digit count symbols on the task order means which are the sum of the digit places in the input cross-check symbols, which digit count is scanned by the scanning means to obtain a digit count pixel image and classified by the classifying means to obtain an input digit count code; and summer means for summing the digit places in the generated cross-check code to provide a generated digit count code which is compared to the input digit count code by the comparator means.

7. A method of dispatching task orders throughout a user network concerning user record documents, comprising the steps:

providing a task order means carried on a input medium suitable for scanning, the task order means containing an input task ID formed by symbols within an ID entry zone within the task order means, the input ID being one of a set of "T" task IDs, one task ID for each dispatched task in a set of "T" dispatched tasks, the task order means containing record document index symbols within index entry zones located within the task order means at predetermined positions relative to the ID entry zone, the index symbols form a unique sequence associated with a particular record document;

scanning the input medium for obtaining a pixel image of the task order means thereon including an input pixel image of the input ID and index pixel images of the index symbols;

classifying the input pixel image and the index pixel images to obtain an input digital code and index digital codes;

providing a set of "T" task ID templates in digital code, each template code corresponding to one task ID in the set of "T" task IDs, and defining the corresponding dispatch task in the set of "T" dispatch tasks;

selecting a template code by comparing the input code to the set of "T" template codes;

providing a zone file for the selected template code from a set of "T" zone files, each zone file corresponding to one task ID in the set of "T" task IDs if a comparison match is obtained, the zone file for the selected code providing the predetermined positions of the index entry zones relative to the ID entry zone;

retrieving the index codes corresponding to index symbols in the index entry zones;

dispatching the task order on the record document associated with the retrieved index codes in accordance with the dispatch task defined by the selected template code.

8. The method of claim 7,
   wherein the task order means has auxiliary data entered by the user at a predetermined position distinct from the predetermined position of the index symbols; and
   wherein the dispatching step further comprises the additional step of creating an auxiliary file associated with the record document file for containing auxiliary data.

9. The method of claim 7, wherein each task ID in the set of "T" task IDs has an assigned ID position within the task order means.

10. The method of claim 9, wherein the task order means has "T" assigned positions, one for each task ID in the set of "T" task IDs.

11. The method of claim 9, wherein the classifying step is two separate steps,
   an input classifying step after the scanning step and before the template selecting step, in which the input ID pixel image from the assigned ID position is classified, and
   an index classifying step after the template selecting step and before the dispatching step, in which the index pixel images are classified.

12. The method of claim 9, wherein during the template selecting step, the input code obtained from the pixel image corresponding to the assigned ID positions within the task order means, is retrieved for comparing to the set of "T" template codes.

13. The method of claim 12, wherein during the template selecting step the input code corresponding to the assigned ID position, is compared to the set of "T" template codes in order of historical frequency of use.

14. The method of claim 12, wherein during the template selecting step the input code corresponding to the assigned ID positions, is compared to the set of "T" template codes in order of most recent use.

15. The method of claim 7, wherein each task ID in the set of "T" task IDs has an unassigned position within the task order means, and during the template selecting step, all of the digital codes obtained from the pixel image are retrieved for comparing to the set of "T" template codes.

16. The method of claim 7, further comprising the additional step of notifying the user after the selection step and before the providing zone file step, if a template has not been selected.

17. The method of claim 16, wherein the notifying step further comprises:
   displaying the input pixel image of the task ID scanned from the input medium means for visual review by the user; and
   displaying the input code classified from the input pixel image for visual review by the user.

18. The method of claim 7, wherein the dispatch task corresponding to the selected template code is filing the record document into a destination in the user network, and the task order means is a cover means accompanying the record document.

19. The method of claim 18, further comprising the additional steps of:
   providing the record document to be filed carried on a medium suitable for scanning prior to the scanning step; and
   scanning the record document to obtain a pixel image of the record document for filing during the dispatching step.

20. The method of claim 19, wherein the record document is a plurality of sheets, and the cover means is a single cover sheet.

21. The method of claim 19, wherein the record document is a single of sheet, and the cover means is carried on the single record document sheet.

22. The method of claim 7,
   wherein the task order means has input cross-check symbols in addition to the input task ID and the record document index symbols, the input cross-check symbols being previously determined by combining the index symbols in accordance with a predetermined mathematical operation, which input cross-check symbols are scanned to obtain a cross-check pixel image and classified to obtain a digital input cross-check code; and
   further comprising the additional steps of:
      combining the retrieved index codes in accordance with the predetermined mathematical operation, after the retrieving step and before the dispatching step, to provide a generated cross-check code; and
      comparing the generated cross-check code with the input cross-check code to determine whether the cross-check codes are the same establishing that the scanning step and the classifying step were error free, or whether the cross-check codes are not the same establishing that the scanning step and the classifying step were not error free.

23. The method of claim 22, further comprising:
   input digit count symbols on the task order means which are the sum of the digit places in the input cross-check symbols, which digit count is scanned to obtain a digit count pixel image and classified to obtain an input digit count code; and
   the additional steps of
      summing the digits in the generated cross-check code to provide a generated digit count code; and
      the comparing step compares the input digit count code with the generated digit count code.

24. The method of claim 22, wherein the predetermine mathematical operation comprises summing the numerical values of the retrieved index codes.

25. The method of claim 24, wherein the predetermine mathematical operation comprises summing the numerical values of the "L" least significant digits of the retrieved index codes.

26. The method of claim 24, wherein the predetermine mathematical operation further comprises multiplying the retrieved index codes by 1,000 prior to summing.

27. The method of claim 24, wherein the predetermine mathematical operation further comprises multiplying the retrieved index codes by a prime number near 1,000 prior to summing.

28. The method of claim 22, further comprising the additional step of notifying the user of any cross-check errors after the cross-check comparing step and before the dispatching step, if the generated cross-check code and the input cross-check code are not the same.

29. The method of claim 28, further comprising the additional step of maintaining an error log after the cross-check comparing step and before the notifying step, to facilitate notifying the user.

30. The method of claim 28, wherein the notifying step further comprises presenting cross-check errors to the user for visual review.

31. The method of claim 28, wherein the notifying step further comprises presenting cross-check errors to the user by displaying the input pixel image of the input ID and the index pixel images of the index symbols and the cross-check pixel image of the input cross-check symbols, scanned from the task order means, and displaying the input code classified from the input pixel image and the index codes classified from the index pixel image and the input cross-check code classified from the cross-check pixel image.

32. The method of claim 28, wherein the notifying step further comprises presenting suspected error sites to the user by displaying the input code and the index codes and the input cross-check code with suspected error sites highlighted.

33. The method of claim 32, wherein the notifying step further comprises presenting user options to resolve the error.

34. The method of claim 28, wherein the notifying step further comprises presenting cross-check errors to the user by displaying the index pixel image of the index symbols scanned from the task order means, and displaying the index codes classified from the index pixel image.

35. The method of claim 29, wherein the notifying step further comprises presenting suspected error sites to the user by displaying the index codes with suspected error sites highlighted.

36. The method of claim 35, wherein the notifying step further comprises presenting user options to resolve the error.

37. The method of claim 28, wherein the notifying step further comprises presenting cross-check errors to the user by displaying the input pixel image of the input ID and the index pixel images of the index symbols, scanned from the task order means, and displaying the input code classified from the input pixel image and the index codes classified from the index pixel image.

38. The method of claim 37, wherein the notifying step further comprises presenting suspected error sites to the user by displaying the input code and the index codes with suspected error sites highlighted.

39. The method of claim 38, wherein the notifying step further comprises presenting user options to resolve the error.

\* \* \* \* \*